Figure 1:
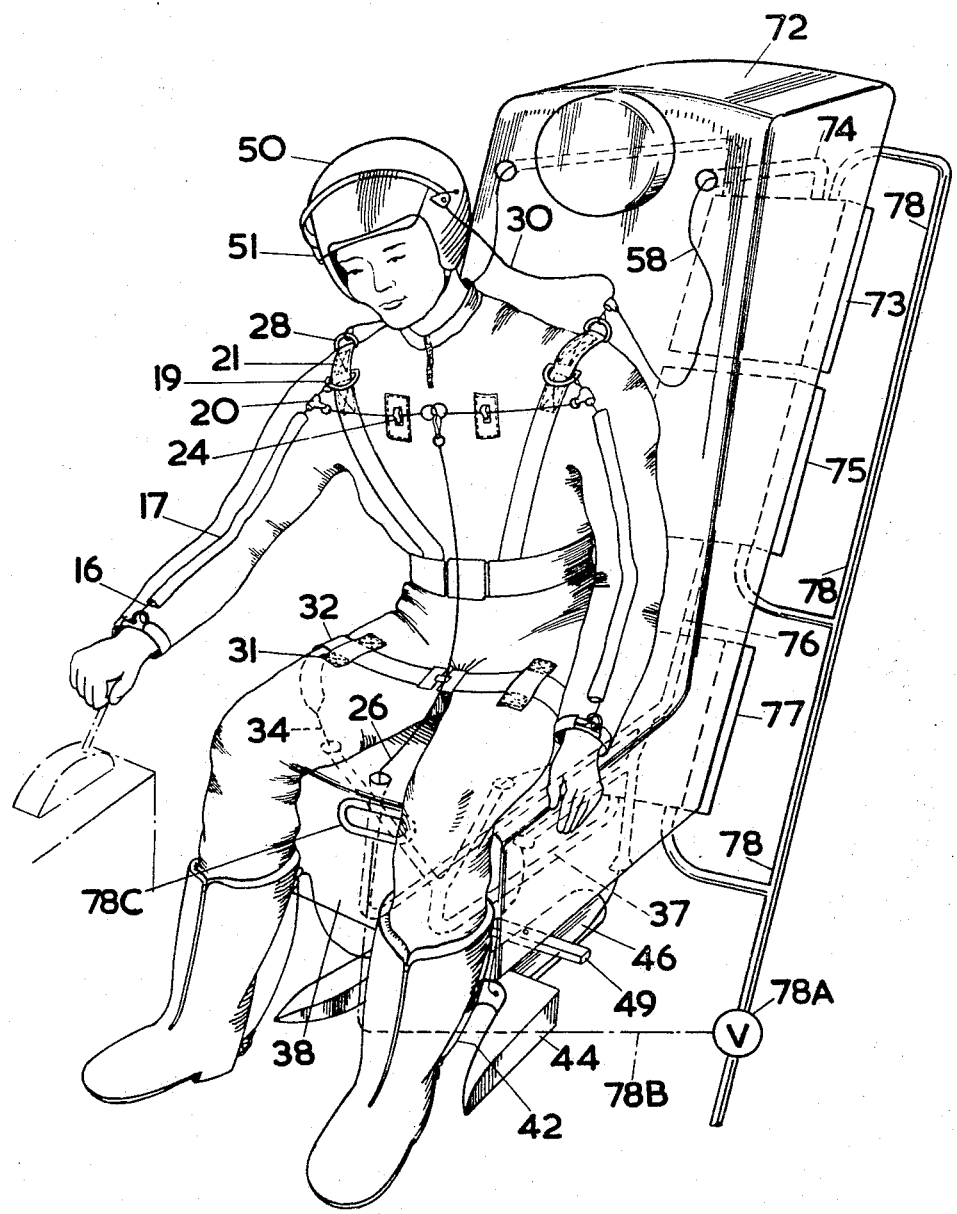

July 4, 1967     A. J. BARWOOD ETAL     3,329,464
BODY RESTRAINTS

Filed April 22, 1965     8 Sheets-Sheet 4

ANTONY J. BARWOOD
MICHAEL L. FISHER
JAMES G. FITZGERALD
Inventors

By Harry A. Herbert Jr.
Attorney

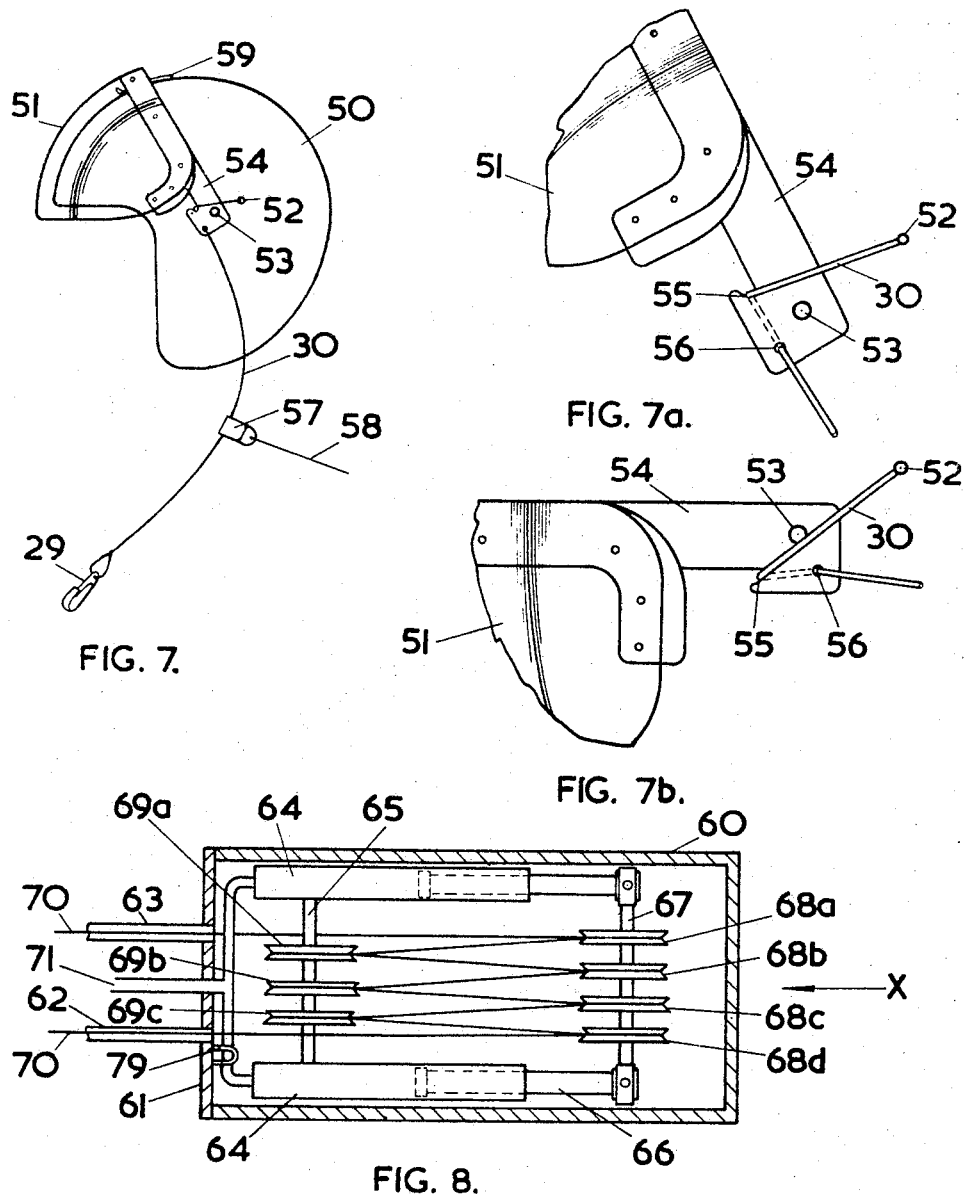

ANTONY J. BARWOOD
MICHAEL L. FISHER
JAMES G. FITZGERALD
Inventors

ANTONY J. BARWOOD
MICHAEL L. FISHER
JAMES G. FITZGERALD
Inventors
By Harry A. Herbert Jr.
Attorney ANTONY J. BARWOOD
MICHAEL L. FISHER
JAMES G. FITZGERALD
Inventors
By Harry A. Herbert Jr.
Attorney United States Patent Office 3,329,464
Patented July 4, 1967

3,329,464
BODY RESTRAINTS
Antony John Barwood, Farnham, Michael Lyndon Fisher, Muharraq, and James Gerard Fitzgerald, Farnborough, England, assignors to Minister of Aviation in Her Britannic Majesty's Government of the United Kingdom of Great Britain and Northern Ireland
Filed Apr. 22, 1965, Ser. No. 452,450
7 Claims. (Cl. 297—389)

This invention relates to means for restraining an occupant's body in a high speed vehicle such as an aircraft or space vehicle, particularly prior and immediately subsequent to his ejection from the vehicle.

The restraining of the whole of an occupant's body from movement relative to his seat both prior and immediately subsequent to ejection from a high speed vehicle is necessary for two main reasons, firstly to prevent possible physical damage due to the forces of the ejection gun or rocket especially if his posture is incorrect and secondly to obviate any possible extensive bodily damage which may occur due to high wind blast loads accompanying and immediately following high speed ejections.

Injury during ejection is greatly promoted by the flailing of the limbs when submitted to ram air pressure such as is encountered during the initial stages of ejection. Limb flailing can result in fractures, fractures-dislocations and traumatic amputations. Head flailing is known to lead to unconsciousness and occasionally to fatal brain damage.

Wind blast loads are proportional to the product of the square of the indicated air speed and the local air density and therefore in low level high speed flight where both the indicated air speed and the local air density are relatively high it is clear that an effective pre-ejection method of body restraint would play a large part in minimising damage to life and limb by positioning the aviator's body in an acceptable ejection attitude and by preventing displacement of the limbs relative to the trunk.

According to the invention a restraint system for securing a body to a seat comprises an arrangement of cord-like tie members for connection with parts of the body apparel and with a tensioning device attached to the seat, the body being unrestrained when the tie members are not in tension, and means whereby upon operation of the device the ties are very rapidly and simultaneously tensioned to hold the body restrained against the seat.

The tensioning device may comprise two parallel axles each of which has a row of pulleys mounted on it, the tie member being passed alternately around a pulley on one axle and then around a pulley on the other, reeling in and tensioning of the tie being effected by moving the two axles apart. This type of apparatus is also known as a jigger.

The means for moving the axles apart may be a telescopic device, the relatively movable parts of which are attached to the axles such that in the retracted position the tie members will permit freedom of movement of the parts of the body apparel connected with them but in the extended position the members are reeled in and tensioned to restrain the parts from movement and to hold them in the desired restrained position.

Means for operating the telescopic device may conveniently be pneumatic.

Each component part of the aviator's apparel being restrained may be individually controlled by its own tensioning device or alternatively the system may include the restraining of a plurality of parts, each part being connected to a common tensioning device.

Adequate restraint for the whole body may be afforded when the system includes tie members fixed to attachments on the body apparel at or adjacent the wrists, heels, shoulders, head and thighs, the ends of the tie members remote from the attachments being connected to the tensioning device.

When used for aviators and applied to ejection seats the operation of the tensioning device may be controlled by the same mechanism as is used for effecting the ejection itself.

An embodiment of the invention for use by aviators will now be described with reference to the accompanying drawings, some of which illustrate alternative forms of component parts.

Figure 2:
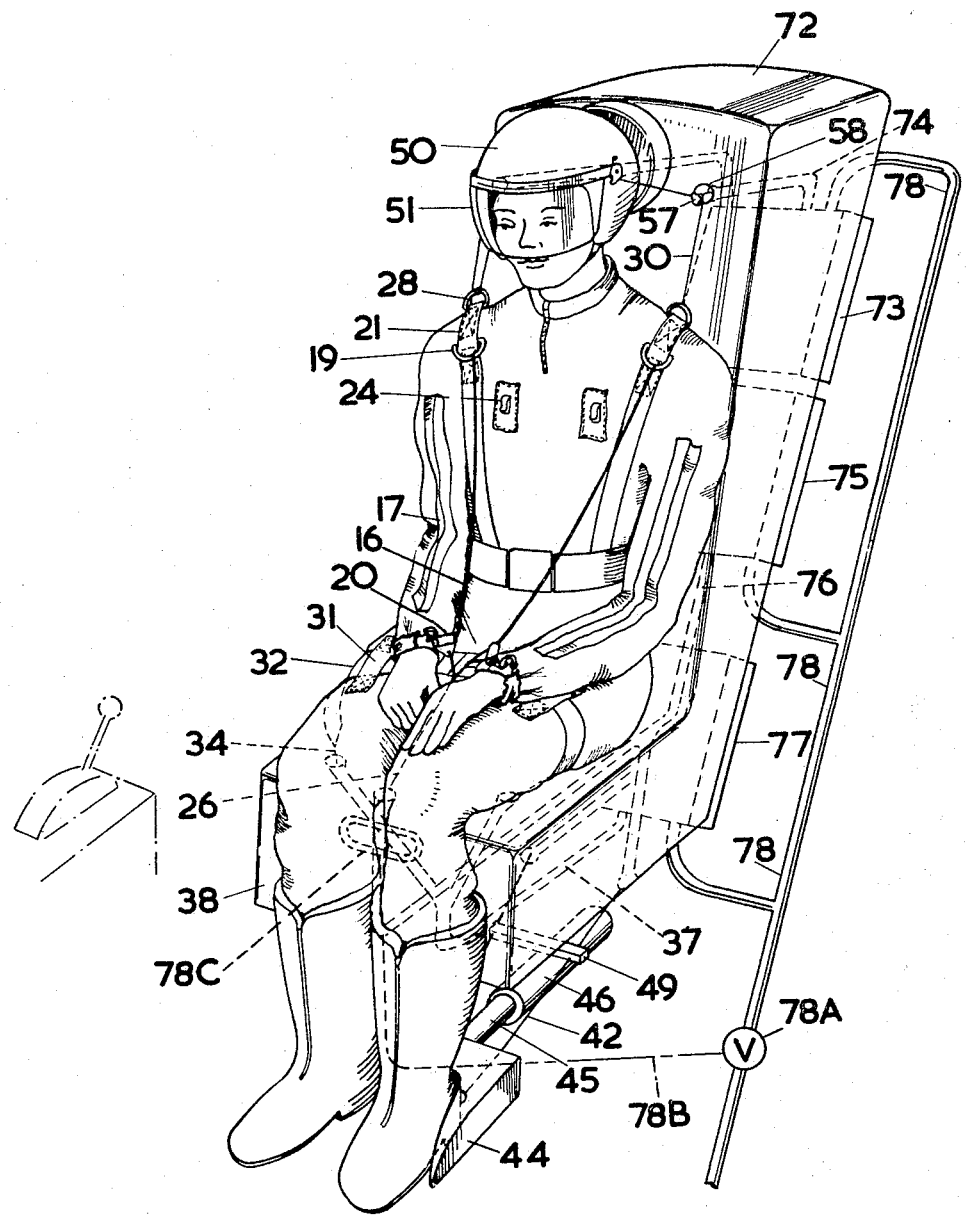
Figures 3, 3A:
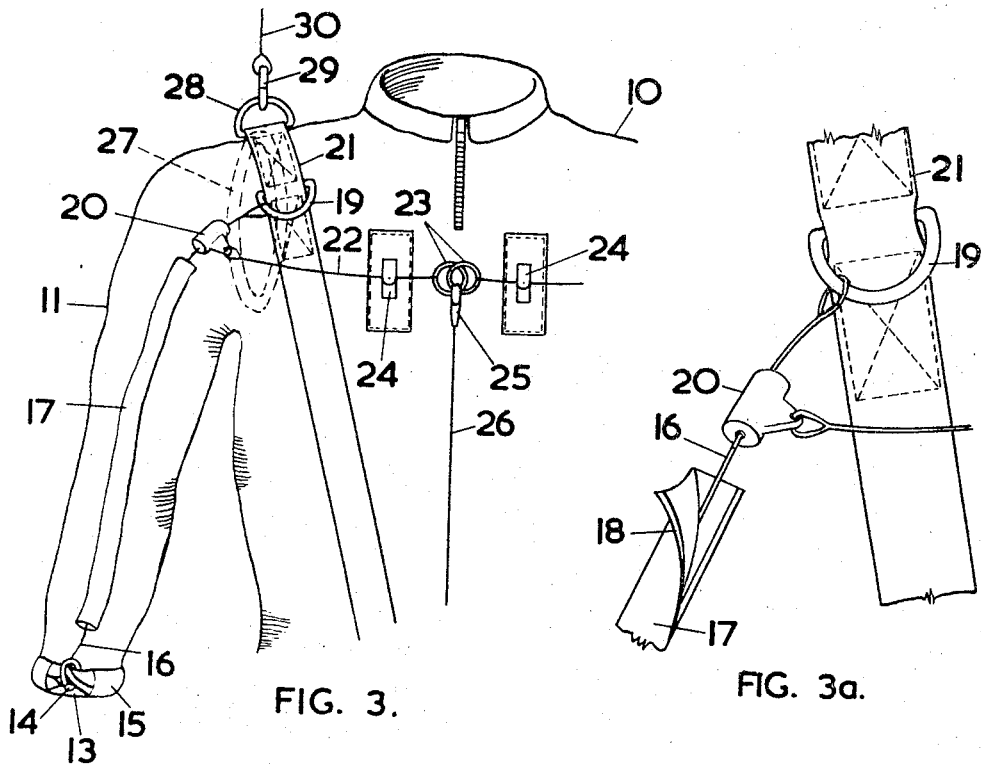
Figures 3B, 3C:
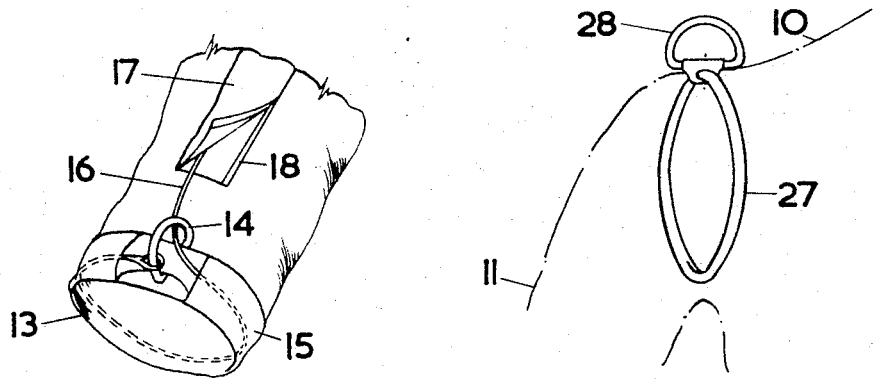
Figure 4:
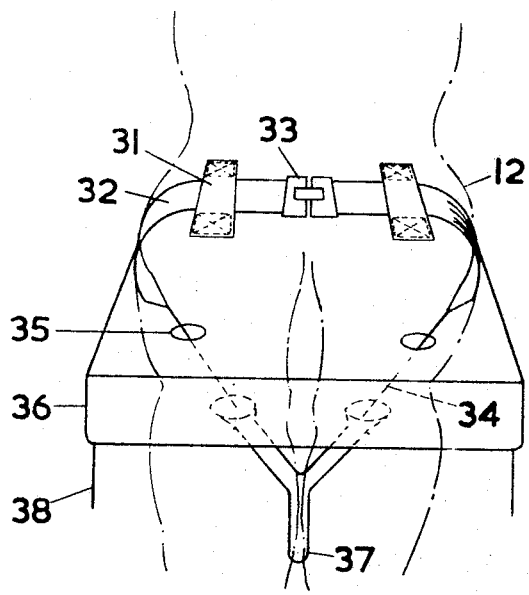
Figure 5:
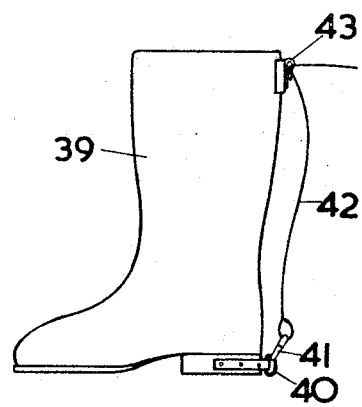
Figure 6:
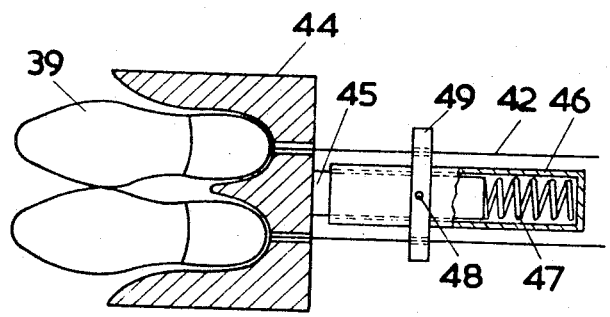
Figure 9:
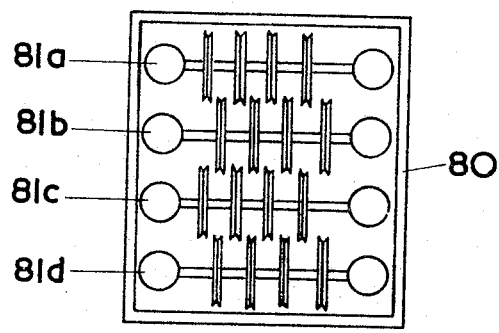
Figure 10:
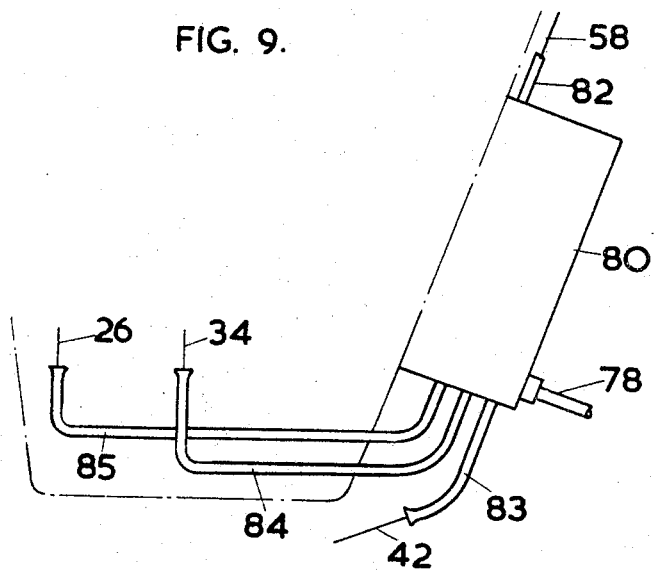
Figure 11:
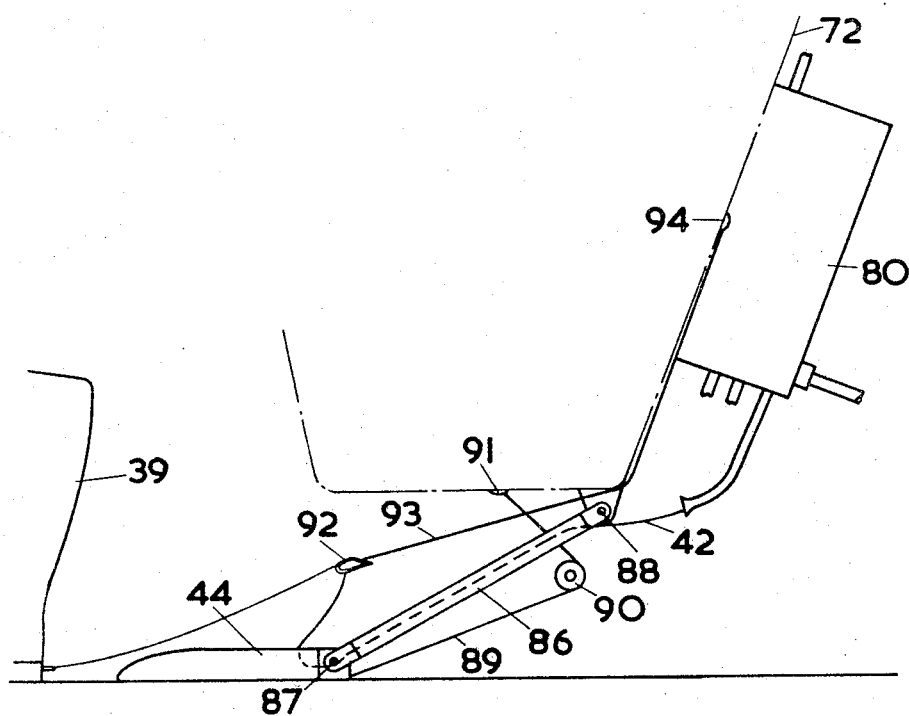
Figures 12, 12A, 12B:
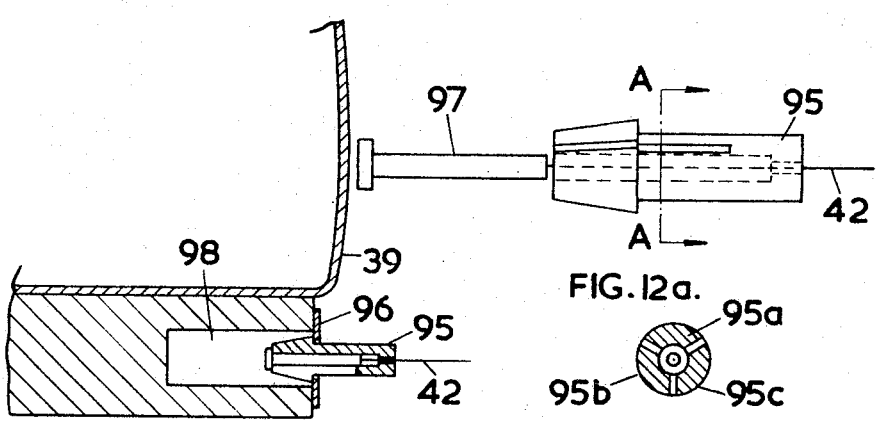
Figure 13:
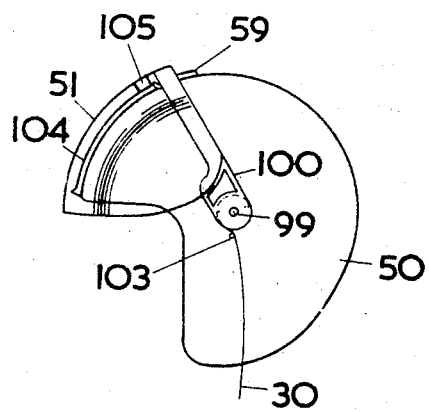
Figure 13A:
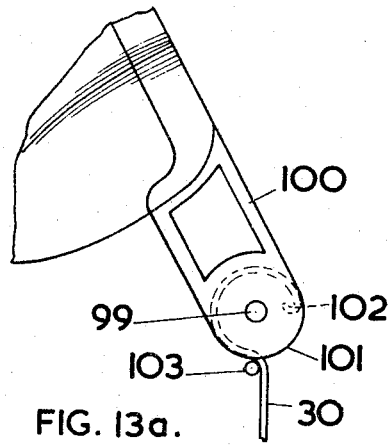
Figure 13B:
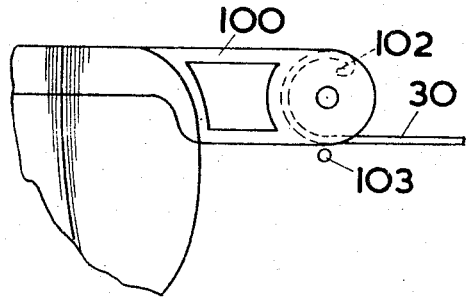

In the drawings:

FIGURE 1 shows the aviator in an unrestrained working position,

FIGURE 2 shows the aviator in the fully restrained condition immediately prior to ejection, FIGURE 3 shows the attachments on a flying overall for use in the restraining of the shoulders and wrists of an aviator, FIGURES 3a, 3b, and 3c elaborate on particular features of these attachments, FIGURE 4 depicts a thigh harness and FIGURES 5 and 6 relate to the restraint of the feet, FIGURES 7, 7a, and 7b show details of the helmet restraint attachments and coupled visor closing mechanism, FIGURE 8 shows a simple jigger, or reeling in device, FIGURES 9 and 13 illustrate alternative features to those shown in the preceding figures, as follows:

FIGURE 9 is a single unit embodying four of the reeling in devices shown in FIGURE 8, FIGURE 10 shows the unit of FIGURE 9 in position on the ejection seat, FIGURE 11 is a preferred foot restraint system, FIGURES 12, 12a and 12b show a method of fixing the restraining cords to the aviator's flying boots, 12b being a section on A—A of 12a and FIGURES 13, 13a and 13b show preferred helmet restraint attachments and visor closing mechanism.

Referring to FIGURES 1 and 2 the restraint generally speaking consists of a system of cords 26, 30, 34, 42, 58, connected with reeling in devices 73, 75 and 77 and, again generally speaking, the restraint system is brought into operation to wind in the cords to pull the aviator hard against the seat as shown in FIGURE 2.

Referring to FIGURES 3, 3a, 3b, 3c and 4 an aviator's flying overall consists of a body portion 10, sleeves 11 and legs 12.

The sleeve cuff 13 has a D shaped ring 44 attached to it on its front side, the straight side of the ring 14 lying in a plane parallel to the sleeve axis. Running around the cuff is a fabric channel 15 terminating either side of the ring 14.

A nylon cord 16 is attached at one end to the ring 14, the other end passing initially around the sleeve cuff 13 inside the channel 15 and then through the ring 14 and up the front of the sleeve 11. The path of the cord 16 up the sleeve 11 is dictated by a special fabric pleat 17 the outside edge of which is sewn permanently into the sleeve fabric whilst the inside edge is fastened down over the cord 16 by a strip of impact fastener 18 such as Velcro (registered trademark).

Located on the front of the body portion 10 of the flying overall approximately 2 ins. above and 2 ins. in from the armpit is a lower-shoulder ring 19 to which the free end of the cord 16 is attached after it has been threaded through a bobbin 20. The ring 19 is held in position by a reinforcing strap 21.

Attached to the bobbin 20 is a chest cord 22 having a small metal ring 23 secured at its other end. The cord 22 is held in position on the aviator's overall by a spring retaining clip 24 which is sewn into the overall fabric adjacent to the central zip fastener.

A snaphook clip 25 engages the rings 23 and also the end of a nylon cord tie member 26 which passes down the front of the body and thence to a reeling in device 75 which functions to wind in the cord to restrain the hands as will be described.

This part of the cord mechanism is designed such that in the unrestrained condition the arms are free to be moved as the aviator wishes and are unhampered by loose cords.

A shoulder ring 28 is attached to the top of the shoulder of the overall and is made to engage with a shoulder loop 27 which lies, apart from its connection to the overall and the ring 28, freely inside the shoulder portion of the overall. The aviator inserts his arm through the loop 27 on donning the suit, the loop being loose enough for comfortable routine use but not nearly as loose as the overall armpit. A snaphook clip 29 connects the ring 28, and hence the loop 27, to a nylon cord 30.

Attached to the front mid-thigh region of the legs 12 of the overall are retaining bands 31 which receive the thigh restraining straps 32. The straps 32 are joined together by a clasp fastener 33. Secured to the ends of the straps 32 remote from the fastener 33 are nylon cords 34 which pass through metal rings 35 on the seat pack 36 before entering a bifurcated pipe 37. The pipe 37 passes along the underside of the seat pan 38 and carries the cords 34 to reeling in device 77 which functions to wind in cords 34 to restrain the thighs as will be described.

Referring to FIGURES 5 and 6, the aviator's flying boots 39 have a metal ring 40 securely attached to the rear of each heel. The ring 40 receives a snaphook clip 41 which is joined to a nylon cord 42. The cords 42 are connected to the same reeling in device 75 as the cord 26 which, when reeled in, restrains the hands. It is therefore necessary, for a purpose to be described later, that the cords 42 should be relatively long. The surplus length is held in an out of the way position by a spring retaining clip 43 which is attached to the rear calf of the boots 39.

A guiding shoe 44, shaped to fit the heels and rear thirds of the flying boots 39, is attached to a piston 45, the piston operating within a cylinder 46 which is secured to the ejection seat below the seat pan 38 and in a position parallel to the floor. In the inoperative position a spring 47, located at the closed end of the cylinder 46, is compressed by the piston 45, the piston being held in the retracted position by a split-pin 48 which passes through a hole in the top side of the cylinder 46 and into the piston 45.

A metal arm 49 which is mounted on the head of the split pin 48, and transversely across the cylinder 46 has apertures at each end. The cords 42 from the flying boots 39 are threaded firstly through two holes in the guiding shoe 44 at the rear mid heel positions and then through the holes in the arms 49. The cords 42 are then ducted to a reeling in device 75 as previously mentioned which functions to wind in the cord 42 and restrain the feet as will be described.

FIGURES 7, 7a and 7b show the helmet 50 restraint system. The visor 51 is pivoted on a swivel fastener 53 and is mounted on a strong lightweight metal frame 54 which has shaped ends extending beyond the fastener 53. Considering the visor in the up position in which the frame 54 is virtually vertical, the shaped ends of the frame 54 include a V notch 55 above and forward of the swivel fastener 53 and a hole 56 below and forward of the fastener 53. The notch 55 and hole 56 lie on an axis parallel to the plane of the frame 54.

The nylon cord 30 (refer FIGURE 3) is secured to the helmet 50 at a point 52 immediately behind the fastener 53 and at a position relating approximately to 1 in., behind the angle formed by the cheek and forehead bones.

From this point the cord 30 passes forward, over part of the frame 54 above the fastener 53 and through the notch 55. It then travels behind the frame 54 for a short distance before it is threaded through the hole 56. The cord 30 is then attached to the shoulder ring 28 by the snaphook clip 29 (refer to FIGURE 3). The length of the cord 30 is sufficient to allow the largest desirable range of head movements.

Attached to the cord 30 by a snaphook clip 57 is a nylon cord tie member 58 which is ducted to a reeling in device 73 controlling the restraint of the head and shoulders. The length of the cords 58 is such as to permit the largest desirable range of head and shoulder movement relative to the aviator's seat.

The visor 51 is held in the up position by a spring retaining clip 59 situated on the top of the helmet 50.

When the cords 58 are tensioned by the reeling in device 73 they exert a pull in the cord 30 which pulls the head towards the seat and sets up a moment about the swivel fastener 53 and pulls the visor into the down or closed position.

Two slightly different forms of the reeling in device referred to above will now be described with reference to FIGURE 8. The housing 60 of the device shown is in the form of a rectangular box closed by an end plate 61 having two pieces of ducting 62, 63 and a securing ring 79 attached to it. Within the housing 60 and fixed to its narrow longitudinal sides are two cylinders 64, with a fixed axle 65 lying transversely between them.

The cylinders 64 contain pistons 66, which extend beyond the open ends of the cylinders to carry a movable axle 67. The movable axle 67 has four pulleys 68a, 68b, 68c, and 68d mounted side by side on it whilst the fixed axle 65 has three pulleys 69a, 69b, and 69c similarly mounted.

A nylon cord 70 is threaded into the device through the duct 63 and is passed along the device adjacent one side of the housing 60 and around the pulley 68a. It then passes back along the device adjacent the opposite side of the housing 60 and around pulley 69a and so on around pulleys 68b, 69b, 68c, 69c and 68d. From 68d it passes out of the device via the duct 62.

In an alternative version of the reeling in device, which will be described later, the cord 70 is secured to the securing ring 79 instead of passing out via the duct 62.

A pipe 71 is connected to the cylinders 64 to supply a fluid, e.g. compressed air, to drive the movable axle 67 away from the fixed axle 65 when desired.

Referring again to FIGURE 1 an aviator is shown sitting in an unrestrained working position in his ejection seat 72. Attached to the back of the seat 72 are the reeling in devices 73, 75 and 77, the construction of which has been described with reference to FIGURE 8.

The reeling in device 73 is connected with the tie member cords 58 which, when reeled in restrain the head and shoulders, the cords 58 being guided to the device 73 by the ducts 74.

Restraint of the wrists and feet is controlled by the device 75 which, due to the relatively long length of cord it is required to reel in, operates in a slightly different manner from the device described with reference to FIGURE 8. As shown a ring 79 is fixed to the end plate 61 adjacent the duct 62. The nylon cord 70 is threaded into the device via the duct 63 and is passed around the pulleys as before. Instead of passing out of the device through the duct 62 however it is secured to the ring 79. With this arrangement a given length of a single cord will be wound in instead of half this length of a double cord for the same relative displacement of the movable axle 67.

Referring again to FIGURE 1 the ducting 76 passes from the device 75 down the back of the seat 72 to a point under the seat pan 38 where it branches into three, two to receive the feet cords 42 and the other to receive the tie member 26 from the chest (refer to FIGURE 3). The tie member 26, it will be remembered, indirectly controls the restraint of the hands.

The spring loaded piston operated guiding shoe 44 previously described with reference to FIGURE 6 co-operates with the device 75. The cylinder 46 is fixed relative to the seat 72 and the piston 45 is shown in the retracted position, being held there by the split pin 48 (FIG. 6). The cords 42 pass through the back of the shoe 44 and through the arm 49 prior to entering the ducting 76.

The tie member cord 26 and the cords 42 are joined together inside the duct 76 so that a single cord (not shown) continues up the ducting into the device 75.

The lap straps 32 are tensioned by reeling the cords 34 into the reeling in device 77, the cords being routed via the duct 37 (refer to FIGURE 4 also).

The reeling in devices 73, 75 and 77 are connected with a source of compressed air by a pipe 78 via a closed valve 78a. A cable 78b connects the valve 78a with the ejection seat firing handle 78c and is operable, when the handle 78c is pulled, to open the valve 78a.

FIGURE 2 is basically the same as FIGURE 1 except that the three reeling in devices 73, 75 and 77 have been actuated and the tie member cords 58, 26, 42 and 34 reeled in to restrain the head and shoulders, the hands (wrists), the feet and the thighs respectively. The visor 51 has been pulled down to cover part of the face and the feet guiding shoe 44 has been moved forward by the action of the piston 45 to act, in conjunction with the reeled in tie member cord 42, to restrain the feet.

The operation of the body restraint system is as follows:

Referring to FIGURES 1 to 8, the aviator pulls on the handle 78c which causes the valve 78a to be opened and admit air under pressure to the cylinders 64. Thereafter the individual components are actuated as follows:

(i) *Head and shoulder restraint (refer to FIGURES 1, 2, 3 and 7)*

The restraint of the head and shoulders is controlled by the reeling in device 73. From the device 73 two ducts 74 guide the tie member cords 58 to the clips 57 which are threaded on to the cords 30 attaching the helmet to the shoulder rings 28.

The clips 57, being relatively heavy, will normally lie just above the shoulder rings 28, but as the cord 58 is reeled in to the device 73 it will initially pull the shoulders back by pulling on the shoulder loop 27 via the ring 28 and then cause the clips 57 to slide upwards along the cords 30 until the head is pulled back and held firmly against the head rest. As has previously been described with reference to FIGURES 7, 7a and 7b the tensioning of the cord 30 under a pull from the cord 58 will automatically close the visor 51. The aviator's head and shoulders are therefore restrained from movement relative to the seat 72 as shown in FIGURE 2.

(ii) *Hand (wrist) restraint (refer to FIGURES 1, 2 and 3)*

The restraint of the hands is controlled by the reeling in device 75 which reels in the tie member cord 26.

When actuated the device 75 reels in the cord 26 so pulling the chest cords 22 from their spring retaining clips 24 and causing the bobbins 20 to slide down the cords 16 as they are torn free from the pleats 17.

The chest cords 22 will finally lie between the aviators thighs with the bobbins 20 holding the wrists together on the upper surfaces of the thighs.

(iii) *Feet restraint (refer to FIGURES 1, 2, 5 and 6)*

Restraint of the feet is conducted in two movements. Firstly the feet are pulled back towards the seat 72 and secondly the rear thirds of the flying boots 39 are guided into a guiding shoe 44 in order to prevent separation and lateral rotation of the feet when they are subjected to the wedging effects of blast between the toes (a phenomenon experienced by aircrew during ejection from the aircraft).

Because it is convenient to use a common reeling in device 75 for both the feet and the hand restraint systems it is necessary to ensure that the length of the cords 42 is such that they are effective in restraining the feet at the same time as the cord 26 is causing an effective restraint of the hands. A degree of latitude is provided in as much as the feet restraint is effected when an equilibrium position has been reached between the reeling in of the cords 42 and the forcing forward of the guiding shoe 44.

The sequence of operation is as follows. When the device 75 is actuated the cords 42 will initially pull the feet towards the seat 72. As the cords 42 are tensioned however they will pull upwards on the arm 49 and so withdraw the split pin 48 from the cylinder 46 and piston 45. This movement will release the piston 45 and cause the guiding shoe 44 to be thrust forward to meet and engage with the rear thirds of the flying boots 39.

Assuming that the force exerted on the piston 45 by the spring 47 is less than that exerted by the device 75 on the cords 42, the final restrained position of the feet will depend on the amount of give and take required between the arms and legs in aviators of different sizes.

Irrespective of the position of the feet prior to the reeling in of the cords 42 the boots 39 cannot fail to enter the guiding shoe 44.

(iv) *Thigh restraint (refer to FIGURES 1, 2 and 4)*

Restraint of the thighs is controlled by the reeling in device 77. The cords 34 form, when attached to the lap straps 32, a complete loop between the thighs and the device 77.

When operated the device 77 tightens the loop around the thighs and brings them rigidly together.

Regarding the alternatives shown in FIGURES 9 to 13, parts which are the same as those of FIGURES 1 to 8 have the same reference number.

FIGURE 9 shows a single unit 80 housing four reeling in devices 81 a, b, c and d each one being similar in construction and operation to the device described with reference to FIGURE 8. Space is conserved by interweaving the pulleys as shown. The view on each of the devices 81 a, b, c and d corresponds with the view on arrow X of FIGURE 8, the casing end plate having been omitted for clarity.

With this single unit 80 containing four reeling in devices it is possible to operate the hands and feet restraint systems from separate reeling in devices.

The approximate location of the unit 80 is shown in FIGURE 10 which also shows the ducting runs 82, 83, 84 and 85 which guide the cords 58, 42, 34 and 26 respectively to restrain the head, feet, thighs and hands.

All of the reeling in devices 81 a, b, c and d are operated by compressed air admitted, as described before, via the pipe 78.

In the preferred embodiment the piston and cylinder mechanism is replaced by the system shown in FIGURE 11. The guiding shoe 44 is held in position by tubular members 86 which also act to duct the feet restraining cords 42 to their reeling in device in the unit 80. The members 86 are pivoted at 87 to the shoe 44 and at 88 to the rear base of the seat 72. This permits the shoe 44 to remain on the floor of the aircraft irrespective of the position of the seat.

A wire 89 is secured to the back of the shoe 44 and is then passed around a fixed pulley 90 and onto the base of the seat 72 where it is secured at 91. The pulley 90 is positioned such that in all positions of the seat 72 (the seat is adjustable both vertically and horizontally for individual use) the rear end of the shoe 44 is kept on the floor after the reeling in device has been actuated and whilst the feet are being pulled back to their restrained position.

Each cord 42 is held in an out of the way position by a ring 92, through which it passes before it is attached to the boot 39, the ring being secured to a length of elastic 93 which passes along the underside of the seat 72 and up the rear to a point 94 where it is fixed.

The cord 42 is attached to the rear of the heel of the boot 39 by a split sleeve 95 as shown in FIGURES 12, 12a and 12b. The sleeve 95 comprises three sprung barbed prongs 95a, b, and c which retain the sleeve in position after it has been inserted through a hole in the retaining plate 96 on the heel of the boot 39. A mandrel 97 is attached to the end of the cord 42 after the cord has been threaded through the sleeve 95. Once the barbed prongs 95a, b and c are through the hole in the retaining plate 96 the mandrel 97 is withdrawn into the sleeve 95 to hold the sleeve in place.

The hole 98 in the heel of the boot 39 must be deep enough to allow the mandrel 97 to be pushed forward and clear of the sleeve 95 so that the prongs may be compressed radially to enable withdrawal of the sleeve.

FIGURES 13, 13a and b show the visor closing mechanism.

The visor 51 is mounted on a strong lightweight frame 100, the frame being pivoted about a pivot pin 99. Attached to, and on the helmet side of, the frame 100 is a pulley 101 which is concentric with the pin 99. The cord 30 is wound three quarters of the way around the pulley 101 to a point 102 where it is securely fixed to the pulley, the visor being in the up position and the free end of the cord hanging approximately vertically after having been guided over a pin 103 which is vertically below the pivot pin 99.

The visor 51 is held in the up position by the retaining clip 59. Running forward across the outside of the helmet from the clip 51 is a guiding rail 104 on which a runner 105, attached to the visor 51 runs.

Upon operation of the head restraint reeling in device the cord 30 is tensioned and pulled rearwards. This motion initially closes the visor 59 due to the moment set up about the pivot pin 99 and holds the head tightly against the seat.

By comparison with the arrangement of FIGURES 1 to 8 the alternative arrangement of FIGURES 9 to 13 differ mainly in the following respects. The reeling in devices 73, 75 and 77 are incorporated in a single unit 80 and ducts 37, 74 and 76 are replaced by ducts 84, 82, 83 and 85 (see FIGURES 9 and 10). The feet have their own separate reeling in device which is incorporated in the unit 80. The piston and cylinder has been replaced by the hinged tube members 86. When the reeling in device is actuated the cords 42 are wound in and pull the boots 39 back until they are securely held in position in the shoe 44. The wire 89 keeps the shoe 44 parallel to the floor during this operation so that the boots 39 are held by their heels when in the restrained condition.

The aviator is released from the harness prior to his separation from the seat by the automatic operation of guillotines on the unit 80, the guillotines cutting the cords free from their reeling in devices. Generally with regard to putting the invention into effect, provision must be made for the aviator's parachute harness and advantageously this may form part of his flying overall.

Advantages of this system of preejection body restraint are:

(a) It is safe in operation.
(b) It does not delay ejection since it utilises normal manual procedure.
(c) Full restraint is accomplished in less than 0.28 sec.
(d) Spine, shoulders and head are in good alignment for ejection.
(e) Individual sizing should not be necessary.
(f) The entire system should not weigh more than 20–25 lbs.
(g) The six connections to the aviator's flying apparel can be made in less than half a minute.

Finally it should be noted that a particular advantage of the invention is that one aircraft crewman can set a number of the restraints in operation in an emergency— as may be necessary with low flying aircraft.

We claim:
1. In combination with a seat, a restraint system for securing substantially the whole of an occupant's body to said seat, said system comprising a tensioning device mounted on the seat, a sleeved suit with leg-covering parts to receive the body of said occupant, a helmet having a closable visor to receive the head of said occupant, a plurality of flexible ties connected with said tensioning device and being movable between a free position wherein the body is unrestrained and a tight position drawing the body against said seat, certain of said ties connecting the sleeve wristbands, the shoulders and the legs of the suit to the restraint system, the other of said ties operably connected with the closable visor of said helmet to close the visor in response to tension in the ties of the restraint system, and said tensioning device including powered means operable to pull all the ties into the tight position.

2. The combination according to claim 1 in which the tensioning device is a jigger.

3. The combination according to claim 1 including a guiding shoe movably mounted on said seat and means for moving said shoe from an inoperative position to an operative feet-engaging position in response to tension in the ties of the restraint system.

4. In combination with a seat, a restraint system for securing substantially the whole of an occupant's body to the seat, the system comprising a suit having sleeves and leg-covering parts to receive the body of said occupant, a helmet having a closable visor to receive the head of said occupant, a plurality of tensioning devices, a plurality of flexible ties movable between a free unrestraining position and a tight restraining position, certain of said ties connecting the sleeve wristbands and the feet of said occupant to a first of said tensioning devices, other of said ties connecting the legs of the suit to a second of said tensioning devices and the remainder of said ties connecting said helmet visor and shoulders of said suit to a third of said tensioning devices, the said tensioning devices having powered means operable to pull all the ties simultaneously into the tight restraining position.

5. The combination according to claim 4 in which the tensioning devices are jiggers.

6. In combination with a seat, a restraint system for securing substantially the whole of the occupant's body to the seat, the system comprising a tensioning device mounted on the seat, a plurality of flexible ties connected with the tensioning device and each connectable with parts of the body, the ties being movable between a free position leaving the body unrestrained and a tight position tying the body down to the seat, the said tensioning device having powered means operable to pull all the ties into the tight position, certain of said ties connectable to and extending rearwardly from the occupant's feet for pulling the feet rearwardly, a guiding shoe movably mounted on and below the seat for movement from an inoperative position to an operative feet engaging position, and separate powered means connected to said guiding shoe responsive to the tensioning of said certain ties to simultaneously move said guiding shoe toward the feet engaging position as said certain ties pull the occupant's feet rearwardly.

7. In combination with a seat, a restraint system for securing substantially the whole of the occupant's body to the seat, the system comprising a tensioning device mounted on the seat, a plurality of flexible ties connected with the tensioning device and each connectable with parts of the body, the ties being movable between a free position leaving the body unrestrained and a tight position tying the body down to the seat, the said tensioning device having powered means operable to pull all the ties into the tight position, a helmet having a closable visor, a guiding shoe movably mounted on and below the seat for movement from an inoperative position to an operative feet engaging position, certain of said ties operably connected with the closable visor of said helmet to close the visor in response to tension in the ties of the restraint system, and separate powered means operable in response to tension in the ties of the restraint system to move said shoe toward the feet engaging position.

References Cited

UNITED STATES PATENTS

| | | | |
|---|---|---|---|
| 2,955,786 | 10/1960 | Drew et al. | 244—122 |
| 3,032,299 | 5/1962 | Martin | 244—122 |
| 3,074,669 | 1/1963 | Bohlin | 244—122 |
| 3,083,938 | 4/1963 | Brinkworth et al. | 244—122 |
| 3,099,261 | 7/1963 | Doss et al. | |
| 3,178,136 | 4/1965 | Bayer | 242—107.4 X |
| 3,179,360 | 4/1965 | Shelton et al. | 244—122 |
| 3,202,384 | 8/1965 | Martin | 244—122 |

FOREIGN PATENTS 1,258,697  3/1961  France.

DAVID J. WILLIAMOWSKY, *Primary Examiner.*

FRANK B. SHERRY, JAMES T. McCALL, *Examiners.*